United States Patent
Fujii et al.

(10) Patent No.: US 7,197,823 B2
(45) Date of Patent: Apr. 3, 2007

(54) METHOD FOR MANUFACTURING CYLINDRICAL MEMBERS AND METHOD FOR MANUFACTURING MOTORS HAVING THE CYLINDRICAL MEMBER

(75) Inventors: Yoshio Fujii, Kyoto (JP); Yosuke Yamada, Kyoto (JP); Akira Otagaki, Toyota (JP)

(73) Assignee: Nidec Corporation, Kyoto (JP)

( * ) Notice: Subject to any disclaimer, the term of this patent is extended or adjusted under 35 U.S.C. 154(b) by 414 days.

(21) Appl. No.: 10/831,176

(22) Filed: Apr. 26, 2004

(65) Prior Publication Data
US 2004/0221444 A1 Nov. 11, 2004

(30) Foreign Application Priority Data
Apr. 25, 2003 (JP) ............... 2003-120826

(51) Int. Cl.
*B21K 1/40* (2006.01)
(52) U.S. Cl. ............... 29/894.362; 29/894.36; 29/596; 29/598; 310/239
(58) Field of Classification Search ......... 29/596–598, 29/521; 310/40 MM, 154, 89; 72/333, 349
See application file for complete search history.

(56) References Cited
U.S. PATENT DOCUMENTS
5,174,025 A * 12/1992 Tasaki et al. .......... 29/894.362
5,268,606 A * 12/1993 Adam et al. .................. 310/88
6,465,927 B2 * 10/2002 Shiraki et al. ............. 310/239
6,594,882 B1 * 7/2003 Tanida et al. ................. 29/596
6,717,322 B2 * 4/2004 Lee ............................ 310/239

FOREIGN PATENT DOCUMENTS
JP   A-S62-31351    2/1987
JP   A-2000-324773  11/2000
JP   B-3195246      8/2001

* cited by examiner

*Primary Examiner*—Minh Trinh
(74) *Attorney, Agent, or Firm*—Westerman, Hattori, Daniels & Adrian, LLP

(57) ABSTRACT

A magnet (10) that is an annular member is fixed or secured on an outer circumference surface or an inner circumference surface of a yoke (4) that is a cylindrical member. An lower end surface in the axial direction of the magnet is fixed or secured to the same plane as a lower end surface in the axial direction of the yoke (4), or the lower end surface in the axial direction of the magnet is fixed or secured so as to protrude a little from the lower end surface in the axial direction of the yoke. An annular groove (4a) that is recessed outward in the radial direction or inward in the radial direction is formed on a part of the outer circumference surface or the inner circumference surface that is continuous to the yoke (4).

18 Claims, 17 Drawing Sheets

(a)

(b)

METHOD FOR MANUFACTURING CYLINDRICAL MEMBERS AND METHOD FOR MANUFACTURING MOTORS HAVING THE CYLINDRICAL MEMBER

CROSS REFERENCE TO RELATED APPLICATION

The disclosure of Japanese Patent Application No. 2003-120826 filed Apr. 25, 2003 including specification, drawings and claims is incorporated herein by reference in its entirety.

FIELD OF THE INVENTION

The present invention relates to a method for manufacturing a cylindrical member having an annular member that is fixed to an outer circumference surface or an inner circumference surface thereof. The method can be used particularly suitably for a motor that includes this cylindrical member.

BACKGROUND OF THE INVENTION

As a conventional motor, there is a known structure in which a magnet is fixed to an inner circumference surface or an outer circumference surface of a cylindrical yoke, and a stator is arranged to face the yoke so that the yoke and the stator rotate relatively to each other by a magnetic field that is generated between the magnet and the stator.

As this type of motor for example, there is an outer rotor type motor as shown in FIG. 13 that is a cross section in the axial direction, in which a magnet M is fixed or secured to the inner circumference surface of a yoke Y, and a stator (not shown) is arranged at the inner side of the magnet M in the radial direction with a gap. In addition, there is another motor shown in FIG. 14 for example, which is a cross section in the axial direction. This motor is an inner rotor type motor having a magnet M that is fixed or secured to an outer circumference surface of a yoke Y and a stator (not shown) that is arranged at the outer side of the magnet M in the radial direction with a gap. When fixing or securing the magnet M to the yoke Y, a position of the magnet M in the axial direction is fixed to that the lower end surface of the magnet M in the axial direction is one the same surface as the lower end surface of the yoke in the axial direction, or that the lower end surface of the magnet M in the axial direction protrude downward from the lower end surface of the yoke in the axial direction.

For example, the following methods are indicated as the manufacture method of this yoke. This manufacturing method includes forming a shaft hole at the center of a sheet iron, and pressing a part of the sheet iron so as to draw and form a cylindrical yoke. In this case, after the drawing process, the cylindrical molded member formed on the sheet iron is cut off from the sheet iron. This cutting can be performed by a method of exerting a shearing force in the axial direction along an imaginary line G or a method of exerting a shearing force in the radial direction along an imaginary line J as shown in FIG. 15 that is the cross section in the axial direction.

In the case where the shearing force is applied in the axial direction, a burr Sb that protrudes in the axial direction is formed at the lower end portion in the axial direction of the molded member S as shown in FIG. 16. As a result, it is difficult to make the dimension of the molded member S in the axial direction at a fine accuracy. In addition, in the case where the shearing force is applied in the radial direction, if the shearing force is applied outward the radial direction as shown in FIG. 17 for example, a burr Sb that protrudes outward in the radial direction is formed on the outer circumference surface of the molded member S. As a result, an annular member such as a magnet cannot be fixed to the outer circumference surface of the molded member S, for example. Therefore, a process is necessary for removing the burr after cutting in either case where the shearing force is applied in the axial direction or in the radial direction.

However, the additional process for removing a burr in the conventional method as described above may increase the number of manufacturing steps and a production cost.

In addition, the method of cutting the outward end portion in the radial direction of the molded member in the axial direction is difficult to apply to a small and low profile type of motor that uses the molded member as a yoke. A magnet is attached to the inner circumference surface or the outer circumference surface of the yoke of the small and low profile type motor, and position detection means such as a Hall element or the like attached to a circuit board or the like is provided immediately below the magnet. The Hall element is generally provided immediately below the magnet and a position that is closer to the magnet so as to detect a change of magnetic flux more precisely, which is generated by rotation of the magnet in the circumferential direction. However, if the yoke is cut in the axial direction, a burr is formed in the axial direction, and a distortion and the like is formed at the opening end portion of the yoke due to the shearing force for cutting. As a result, a dimension of the yoke in the axial direction cannot be finished precisely. If the dimension of the yoke in the axial direction cannot be finished precisely, a distance between the magnet and the position detection means such as a Hall element disposed adjacent thereto becomes uneven along the circumferential direction. As a result, the position detection means such as a Hall element cannot detect a magnetic flux of the magnet, and reliability of the motor is deteriorated.

SUMMARY OF THE INVENTION

An object of the present invention is to provide a method for manufacturing a cylindrical member that is superior in accuracy and an annular member such as a magnet can be fixed or secured to an inner circumference surface or an outer circumference surface thereof, and a method for manufacturing a motor having the cylindrical member.

In addition, another object of the present invention is to provide a method for manufacturing a cylindrical member that can be produced at a low cost and is superior in dimension stability and reliability, and a method for manufacturing a motor having the cylindrical member.

Furthermore, another object of the present invention is to improve reliability of a motor having a cylindrical member as a yoke.

In order to achieve these object, a method for manufacturing a cylindrical member according to one aspect of the present invention includes the steps of forming a cylindrical portion by a plastic deformation of a flat plate by inserting a die from lower to upper direction, cutting the cylindrical portion out of the flat plate in from inner to outer direction, fixing or securing an annular member on and in contact with an outer circumference surface of the cylindrical portion after the cutting step, and forming an annular groove that remains after the cutting step along a cutting line of the upper portion in the flat plate and on a concentric circle of the cylindrical portion, before the step for forming the cylindrical portion.

The annular member is fixed or secured so that the lower end portion of the annular member is disposed on the same plane as the end portion of the cylindrical portion or protrudes in from upper to lower direction from the end portion of cylindrical portion, and the annular groove is disposed on the outer circumference surface that is continuous to the end portion of the cylindrical portion after the step for forming the cylindrical portion, so that a burr that is formed in the cutting step is housed in the annular groove.

The cylindrical member of the present invention can be finished precisely concerning the dimension in the axial direction because the end portion of the cylindrical member is cut. An annular groove is provided on an outer circumference surface of the cylindrical member to which the annular member is fixed or secured, so a burr is housed in an annular groove even if the burr is formed in the cutting step. Therefore, the burr does not become an obstacle when fixing or securing the annular member.

DETAILED DESCRIPTION OF THE PREFERRED EMBODIMENTS

Figure 1:
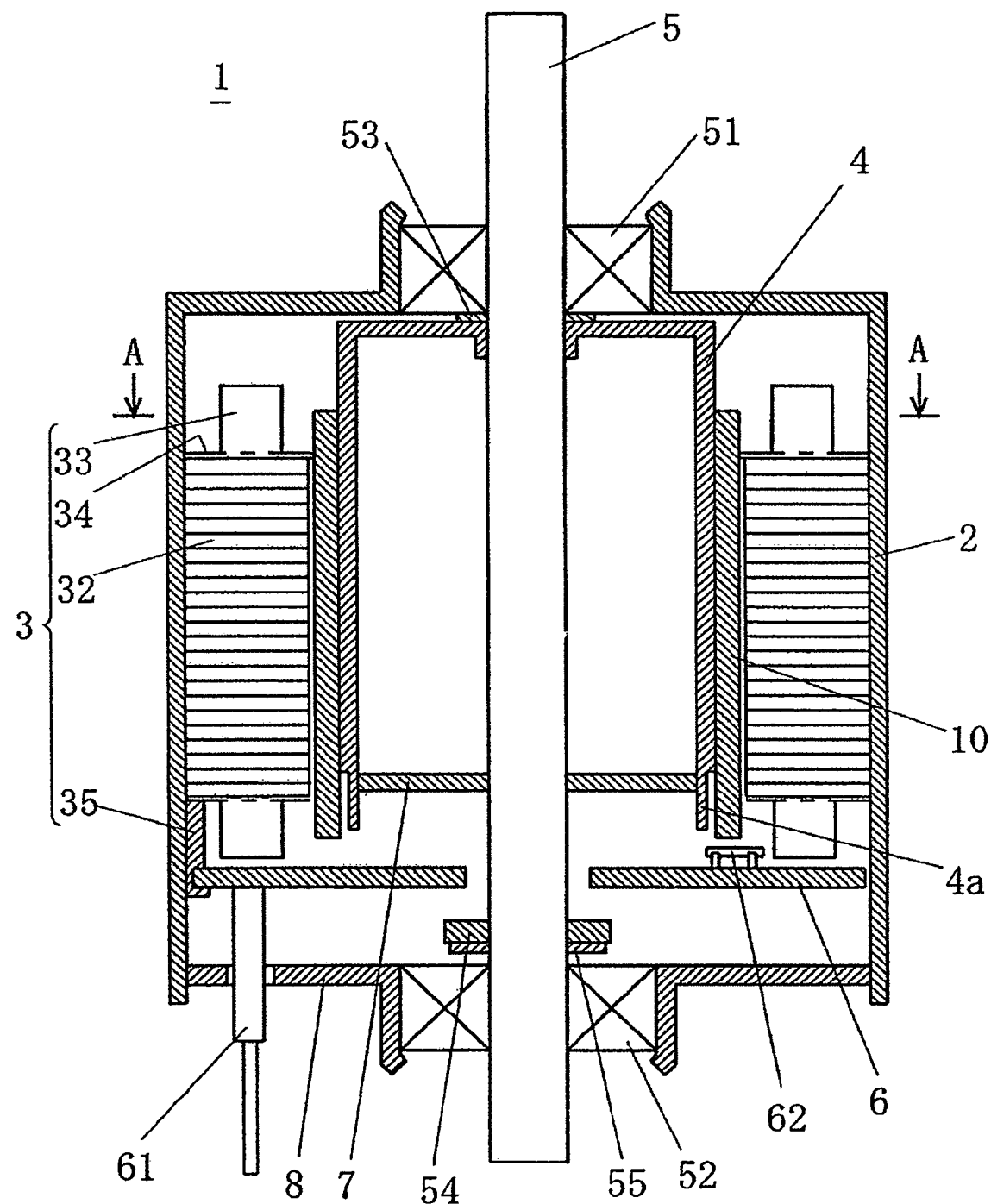
FIG. 1 is a cross section in the axial direction of a motor according to an embodiment of the present invention.
Figure 2:
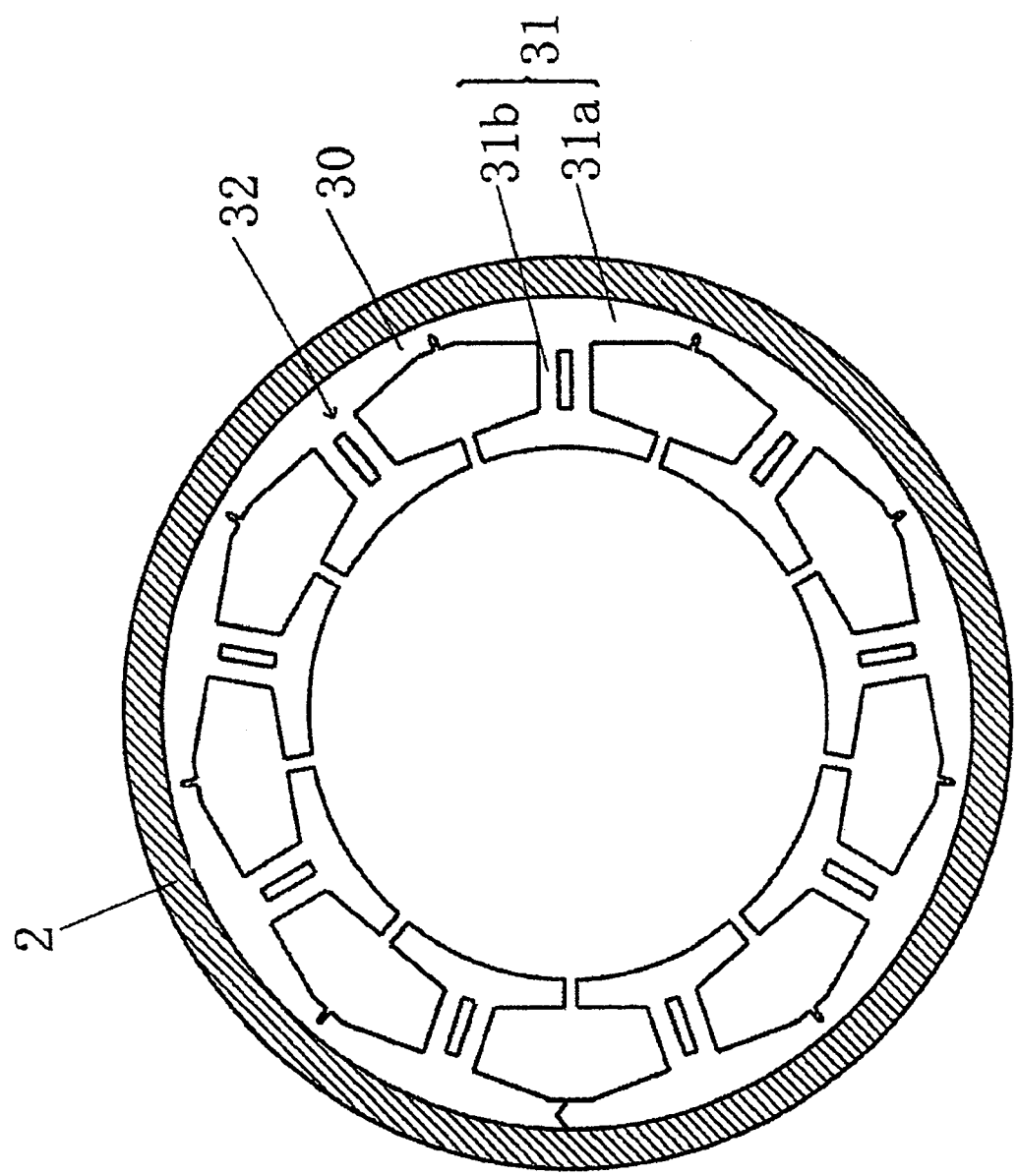
FIG. 2 is an A—A cross section of the motor shown in FIG. 1.

Hereinafter, a motor according to one embodiment of the present invention will be described with reference to the attached drawings. FIG. 1 is a cross section in the axial direction of a motor according to an embodiment of the present invention, and FIG. 2 is an A—A cross section of the motor shown in FIG. 1. However, peripheral members such as a rotation shaft and a winding are omitted in FIG. 2. Note that though the vertical direction in each drawing is referred as the "vertical direction" in the description of an embodiment of the present invention for convenience, it does not limit the direction in the real mounted state.

A motor 1 includes a cylindrical housing 2 that has a small opening portion 2a formed upward in the axial direction and a large opening portion 2b formed downward in the axial direction and being larger than the small opening portion 2a, a stator 3 that is fixed to an inner circumference surface of the housing 2, a circuit board 6 that is attached to the stator 3, and a plate 8 that is attached to the housing 2.

As shown in FIG. 2, the stator 3 includes a stator core stack 32, a winding 33 around the stator core stack 32, and insulators 34 and 35 that sandwich the stator core stack 32 upward and downward in the axial direction. The stator core stack 32 is a laminate made of a plurality of stator cores 30 that is stacked in the axial direction as shown in FIG. 1, and each of the stator cores 30 is made of a plurality of core pieces 31 that are continuous in the circumferential direction. Each of the core pieces 31 has a core back 31a extending in the circumferential direction and tooth 31b protruding from the center of the core back 31a inward in the radial direction. Each of the teeth 31b is formed to have a T-shape in a plan view, and a winding 33 is wound around the bar portion of the T-shape extending in the radial direction.

A method for manufacturing this stator 3 includes a step for forming a stator core 30 having a plurality of core pieces 31 that are linked via a thin linking portion by stamping an flat rolled magnetic steel sheets and strip for example, and a step for forming a stator core stack 32 by laminating a plurality of the stator cores 30. Next, the stator core stack 32 is sandwiched upward and downward in the axial direction by the insulators 34 and 35, and then the winding 33 is turned around the stator core stack 32. Finally, the linking portions of the plural core pieces 31 are curved so as to deform into an annular shape and form the stator 3. Note that FIG. 2 shows a state without the winding 33 for convenience so as to show the shape of the core pieces 31.

An upper bearing 51 is attached to the upper small opening portion 2a in the axial direction of the housing 2, while the plate having the shaft hole at the center of 8 is fixed to a lower large opening portion 2b in the axial direction of the housing 2. A lower bearing 52 is fit in the shaft hole of the plate 8, so that the upper bearing 51 and the lower bearing 52 retains a rotor in a rotatable manner.

The rotor includes a rotation shaft 5 that is retained by the upper bearing 51 and the lower bearing 52, a cylindrical yoke 4 that is disposed between the upper bearing 51 and the lower bearing 52, and is attached to the rotation shaft 5 to as to rotate together with the rotation shaft 5, and an annular magnet 10 that is fixed or secured to the outer circumference surface of the yoke 4 by means of an adhesive or the like.

The rotation shaft 5 penetrates the housing 2, the yoke 4, a cap 7, the circuit board 6 and the plate 8 in the axial direction. A resin washer 53 is fixed between an upper end surface of the yoke 4 and the upper bearing 51 on the rotation shaft 5. In addition, a metal washer 54 and a resin washer 55 are fixed respectively at a little upper in the axial direction from the lower bearing 52 of the rotation shaft 5. The metal washer 54 prevents the rotation shaft 5 from dropping off.

The yoke 4 is an annular cylindrical member that is formed from a magnetic material such as a SECE (a galvanized steel), for example. The yoke 4 is arranged to form concentric circles with the housing 2 and has opening portions at the upper side and the lower side in the axial direction. The cap 7 having the shaft hole at the center is attached on the inner circumference surface of the opening portion at the lower side in the axial direction. In addition, on the outer circumference surface of the yoke 4, an annular groove 4a is concave portion inward in radial direction and has an outer diameter smaller than the outer circumference surface of the yoke 4 in the axial direction. The annular groove 4a has openings at the lower side in the axial direction and outward in the radial direction. As described above, on the outer circumference surface of the yoke 4, a magnet 10 that faces the stator 3 in the radial direction is fixed or secured by means of an adhesive or the like. The lower end portion in the axial direction of the magnet 10 protrudes in the axial direction from the lower end portion in the axial direction of the yoke 4. Therefore, the annular groove 4a of the yoke 4 is hidden behind the magnet 10 when viewing from the outside in the radial direction. The yoke 4 is fixed to the rotation shaft 5 by pressing the rotation shaft 5 into the upper opening portion in the axial direction and the shaft hole of the cap 7.

The circuit board 6 that is fixed to the insulator 35 is provided between the yoke 4 (the stator 3) and the metal washer 54 in the axial direction, a lead wire 61 is attached to the circuit board 6 for connecting the winding 33 and an external circuit, and the Hall element 62 is disposed on the upper surface of the circuit board 6.

Figure 3:
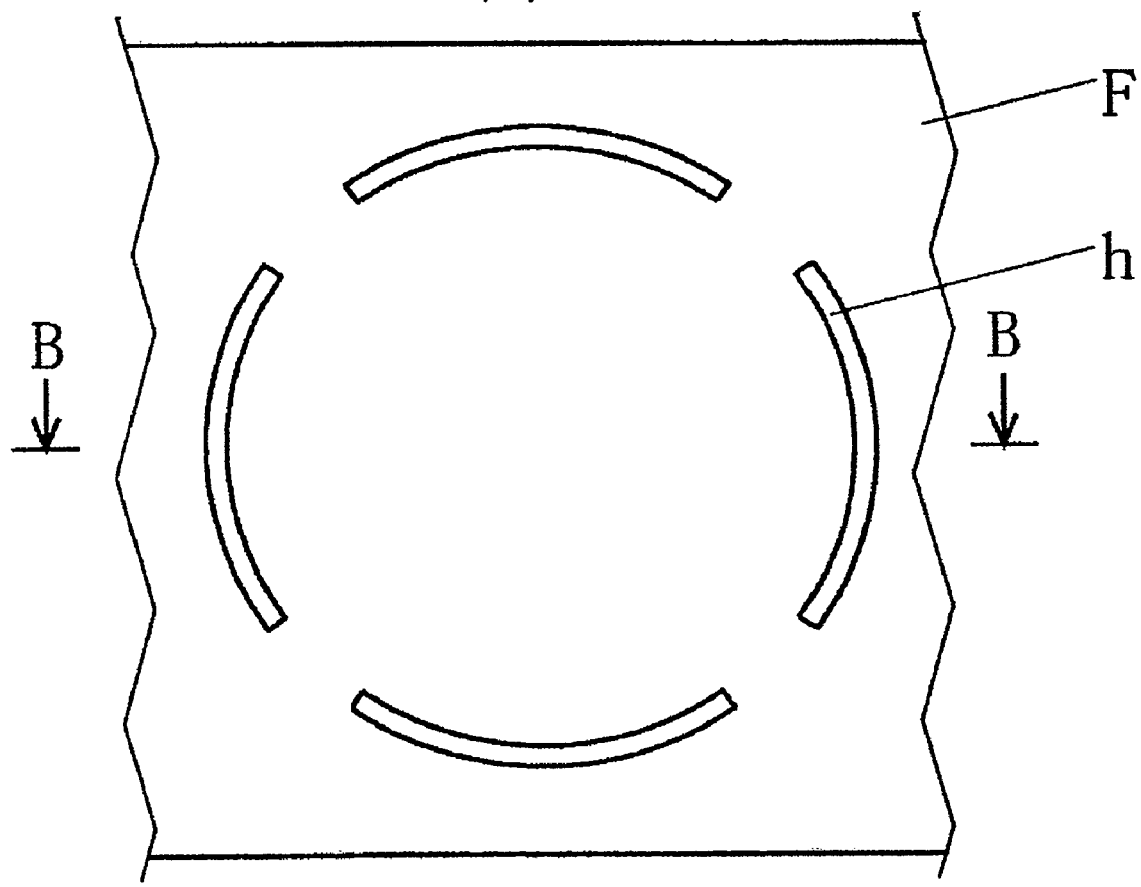
FIG. 3(a) is a plan view showing a first step of a method for manufacturing a yoke that is used for a motor shown in FIG. 1.
FIG. 3(b) is a B—B cross section of FIG. 3(a).
Figure 3:
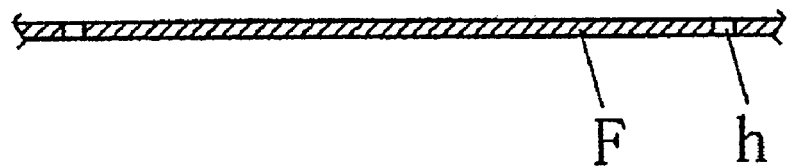
Figure 4:
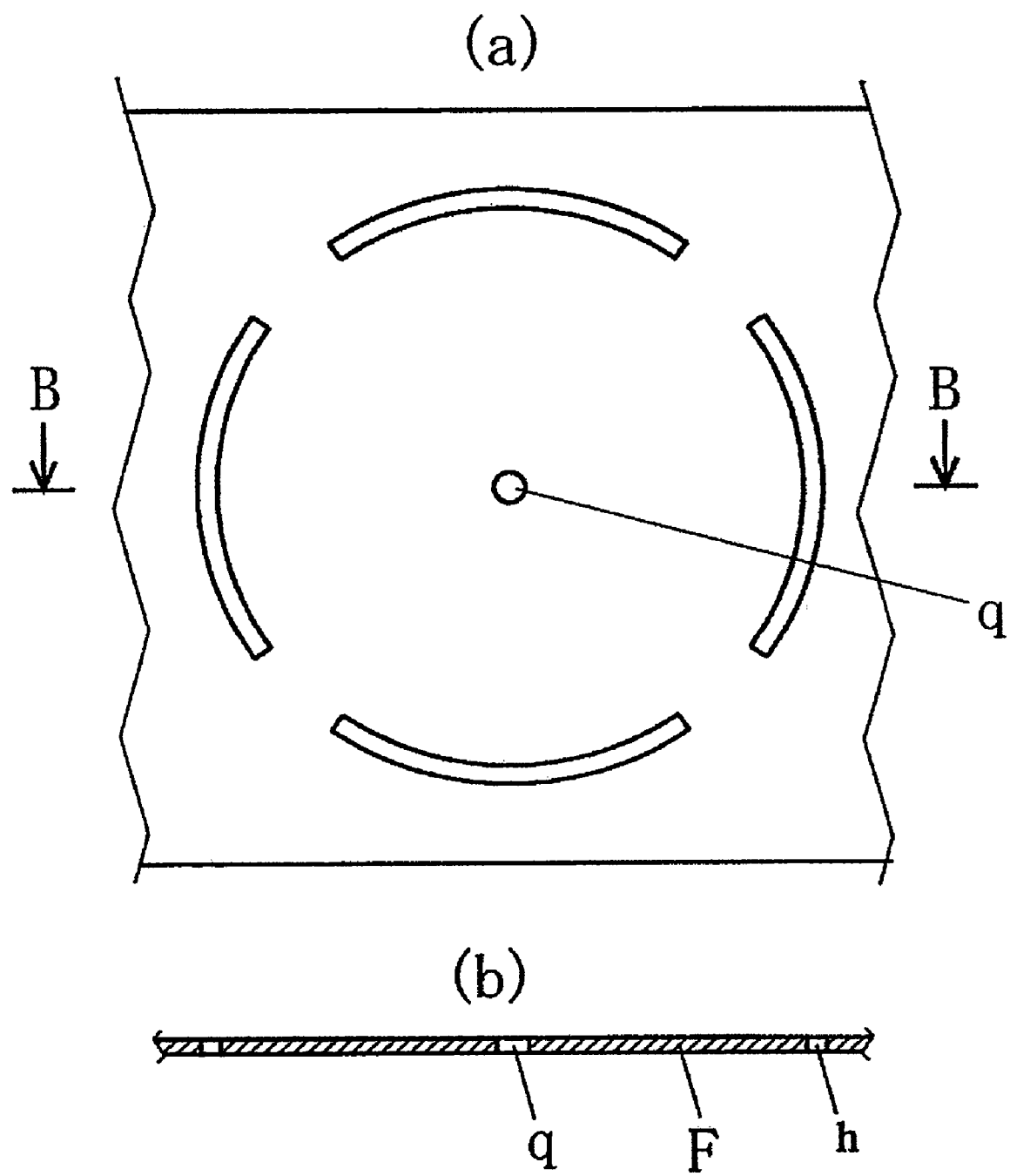
FIG. 4(a) is a plan view showing a second step of the method for manufacturing a yoke that is used for a motor shown in FIG. 1.
FIG. 4(b) is a B—B cross section of FIG. 4(a).
Figure 5:
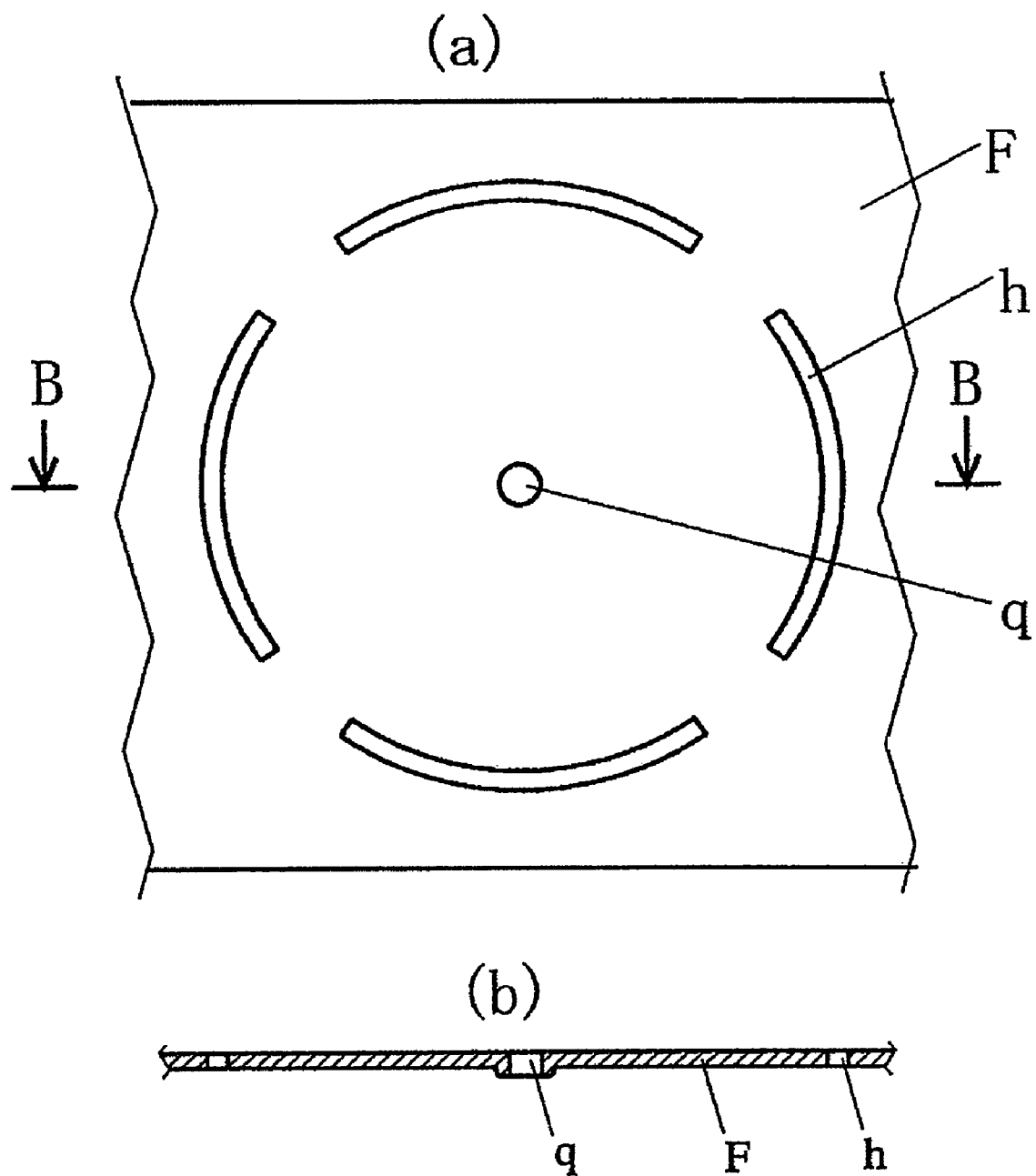
FIG. 5(a) is a plan view showing a third step of the method for manufacturing a yoke that is used for a motor shown in FIG. 1.
FIG. 5(b) is a B—B cross section of FIG. 5(a).
Figure 6:
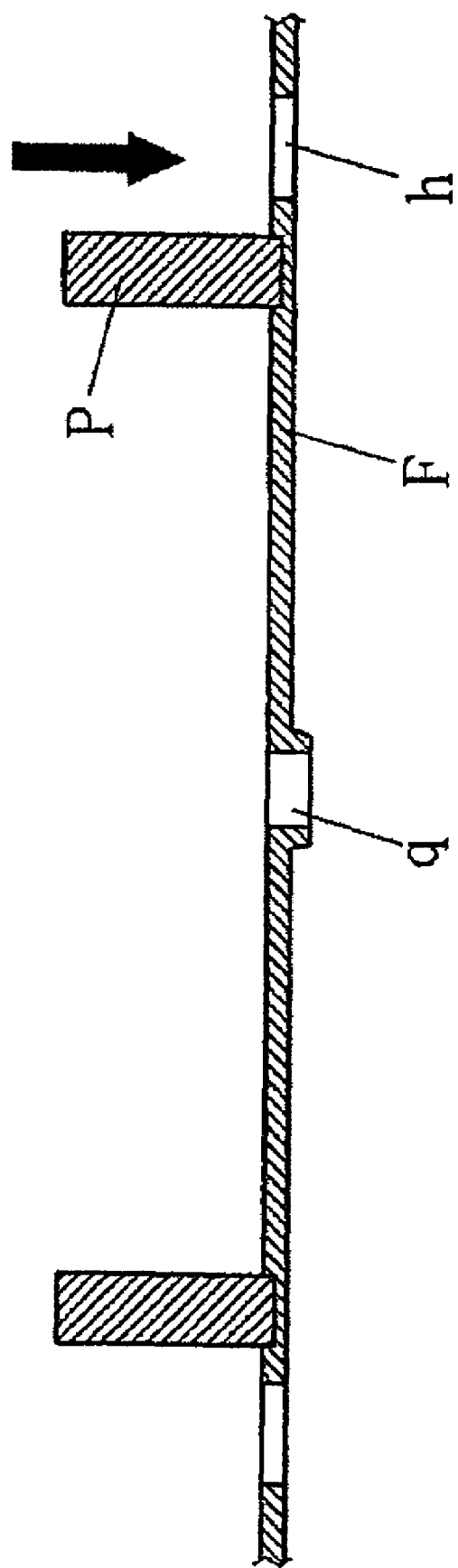
FIG. 6 is a cross section in the axial direction showing a fourth step of the method for manufacturing a yoke that is used for a motor shown in FIG. 1.
Figure 7:
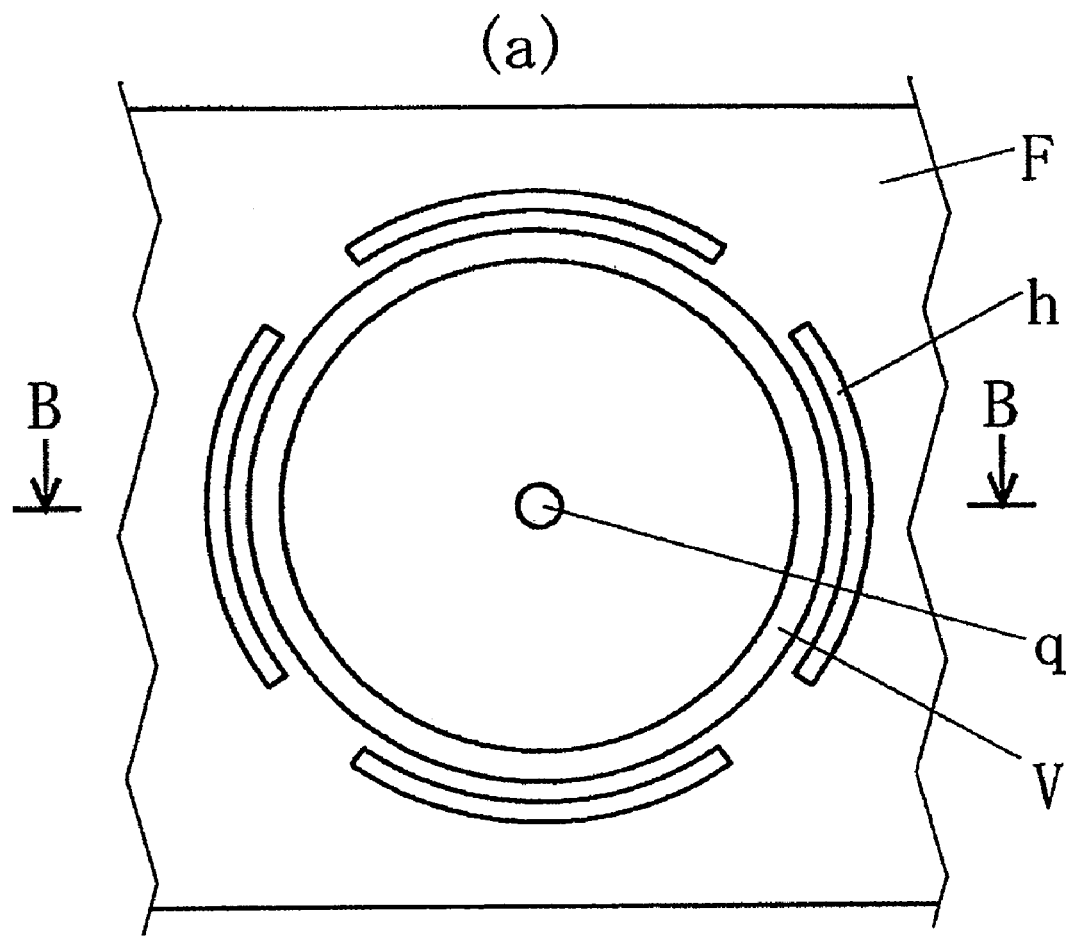
FIG. 7(a) is a plan view showing a fifth step of the method for manufacturing a yoke that is used for a motor shown in FIG. 1.
FIG. 7(b) is a B—B cross section of FIG. 7(a).
Figure 7:
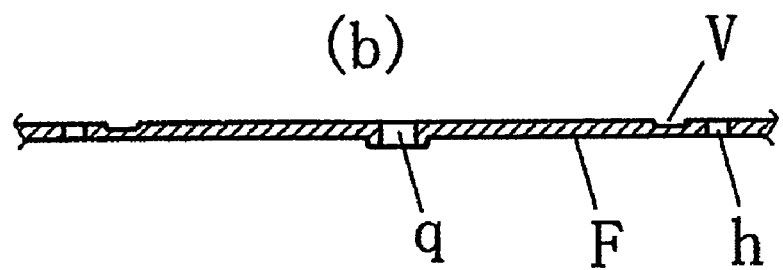
Figure 8:
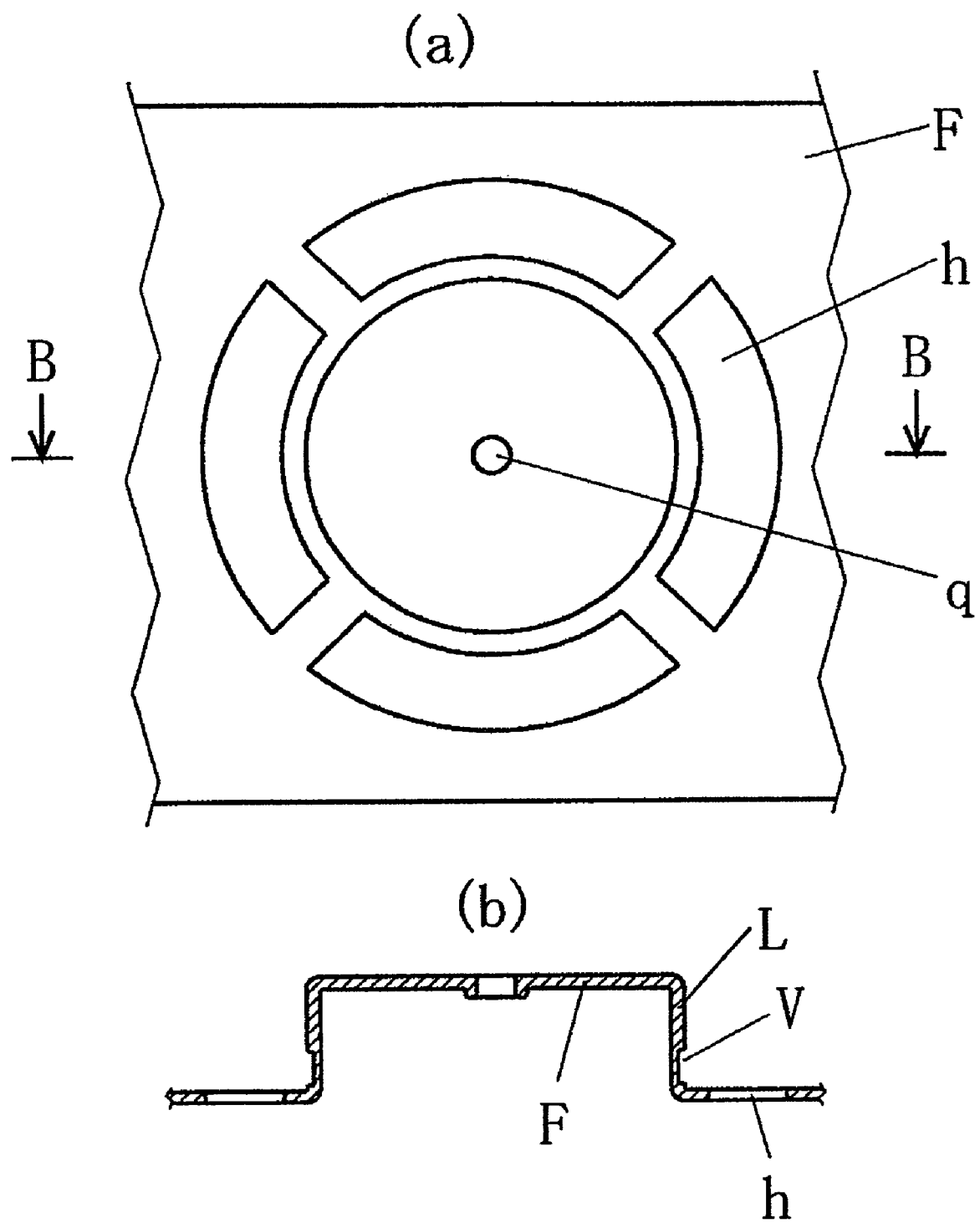
FIG. 8(a) is a plan view showing a sixth step of the method for manufacturing a yoke that is used for a motor shown in FIG. 1.
FIG. 8(b) is a B—B cross section of FIG. 8(a).
Figure 9:
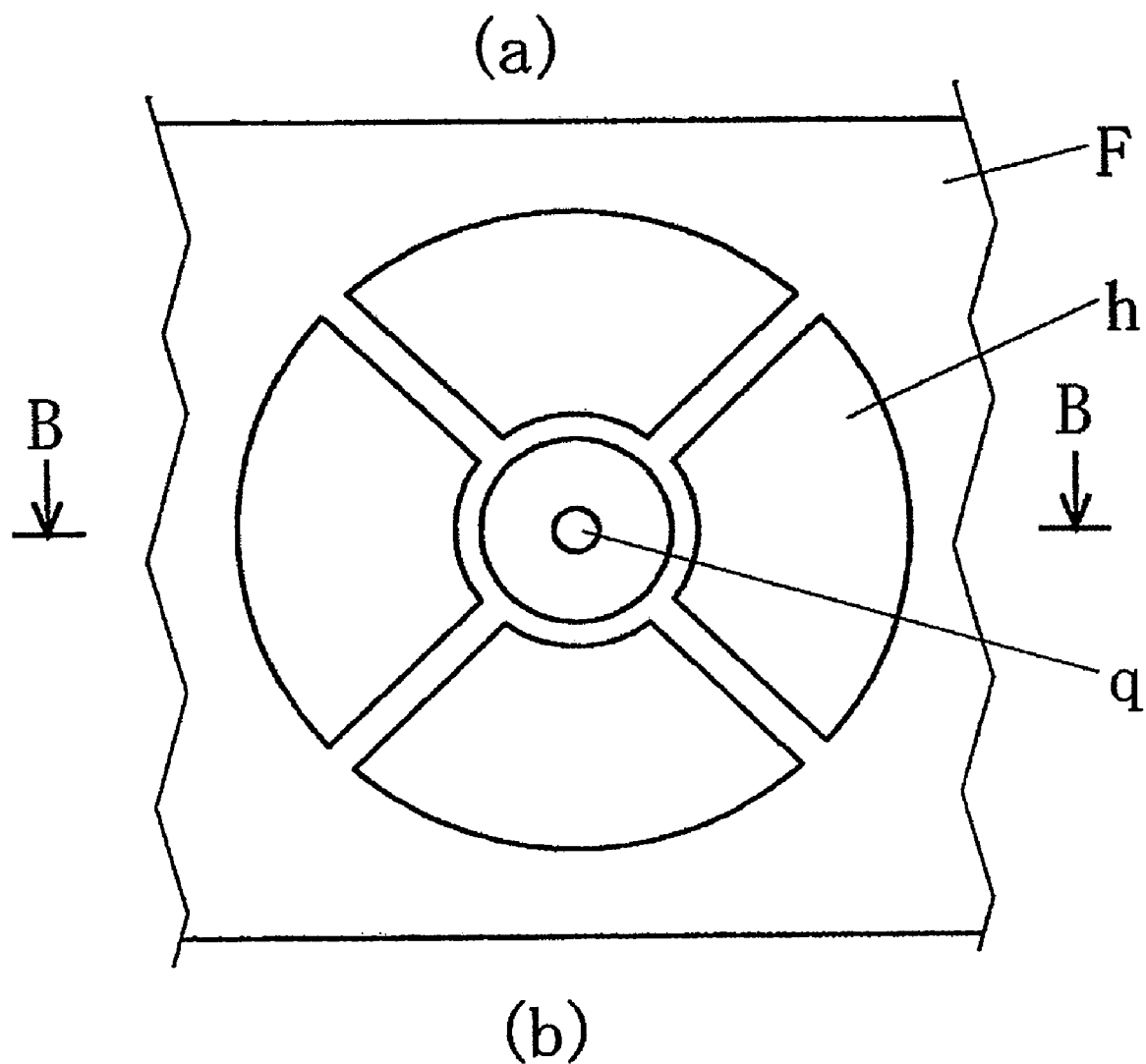
FIG. 9(a) is a plan view showing a seventh step of the method for manufacturing a yoke that is used for a motor shown in FIG. 1.
FIG. 9(b) is a B—B cross section of FIG. 9(a).
Figure 9:
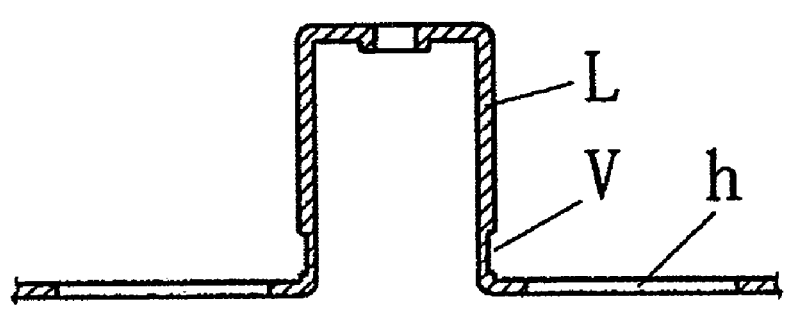
Figure 10:
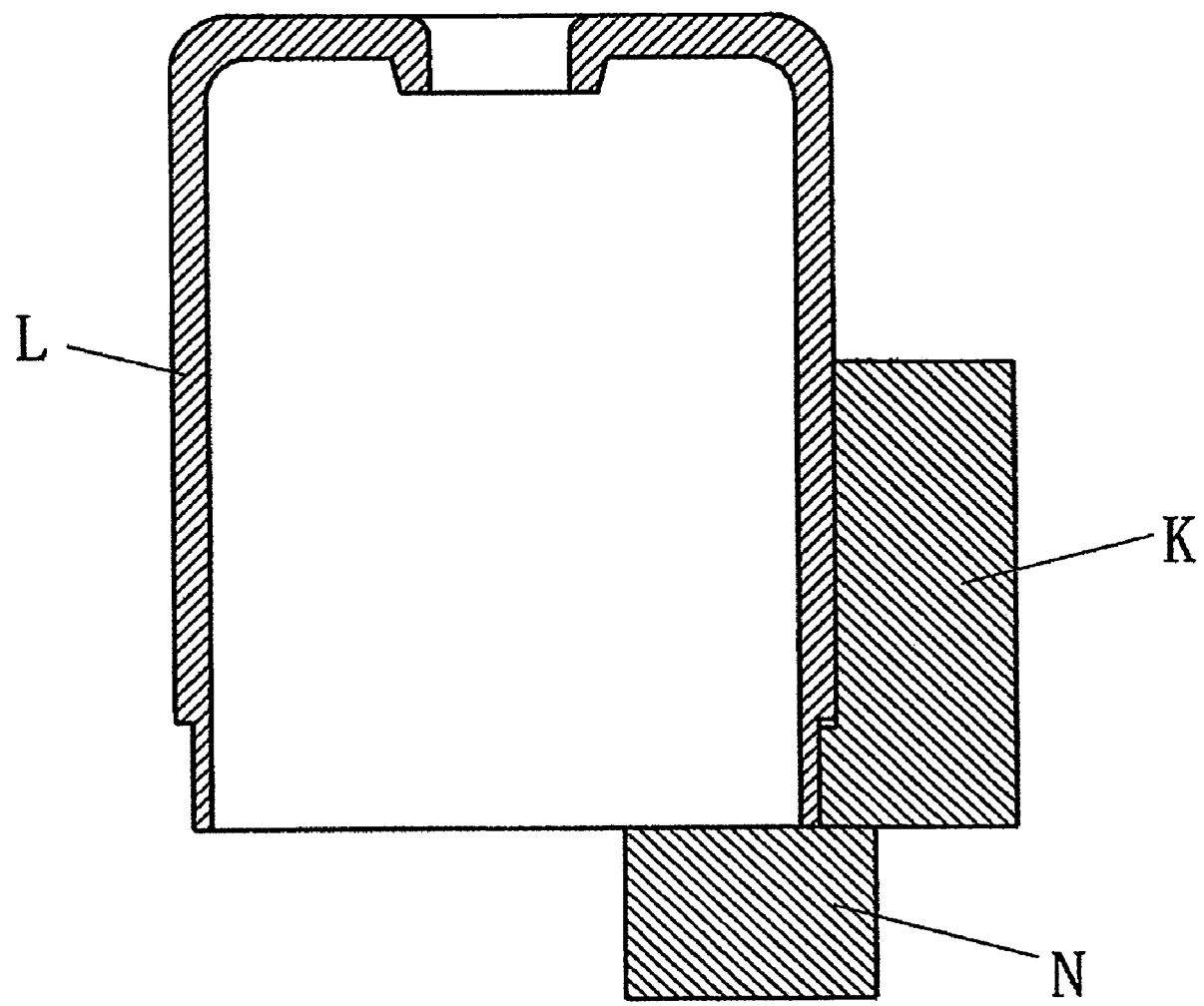
FIG. 10 is a cross section in the axial direction showing an eighth step of the method for manufacturing a yoke that is used for a motor shown in FIG. 1.

Next, a method for manufacturing the yoke 4 will be described with reference to FIGS. 3(a) through 11. FIGS. 3(a), 4(a), . . . 9(a) are plan views showing a sheet iron in a state before being formed to the yoke 4, and FIGS. 3(b), 4(b), . . . 9(b) are B—B cross sections of FIGS. 3(a), 4(a), . . . 9(a), respectively. The sheet iron F is stamped by a die so as to make four arc holes h along a circumferential line (FIGS. 3(a) and 3(b)). A center hole q is made at the center of a circumferential line (FIGS. 4(a) and 4(b)), and the rim of the center hole q is raised in the axial direction (FIGS. 5(a) and 5(b)). Then, an annular groove V is formed by pressing the sheet iron F by an annular punch P having an outer diameter a little smaller than an inner diameter of the holes h as shown in FIG. 6 as a cross section in the axial direction (FIGS. 7(a) and 7(b)). The area surrounded by the holes h is processed by deep drawing for example, which is a plastic deformation, so that a cylindrical portion L is formed. Thus, the holes h are enlarged and extended in the thickness direction (FIGS. 8(a) and 8(b)). The sheet iron F is processed by deep drawing again so as to increase a height of the cylindrical portion L (FIGS. 9(a) and 9(b)). Finally, as shown in FIG. 10, the annular member K is made contact to the outer circumference surface of the cylindrical portion L, and the lower end portion in the axial direction of the cylindrical portion L is cut off outward in the radial direction from the inner circumference surface of the cylindrical portion L by using a cutting tool N. Thus, the cylindrical portion L is formed as the yoke 4 shown in FIG. 11. The annular groove 4a having an outer diameter that is the annular groove V is formed on the outer circumference surface that is continuous to the lower end portion in the axial direction of the yoke 4.

Figure 11:
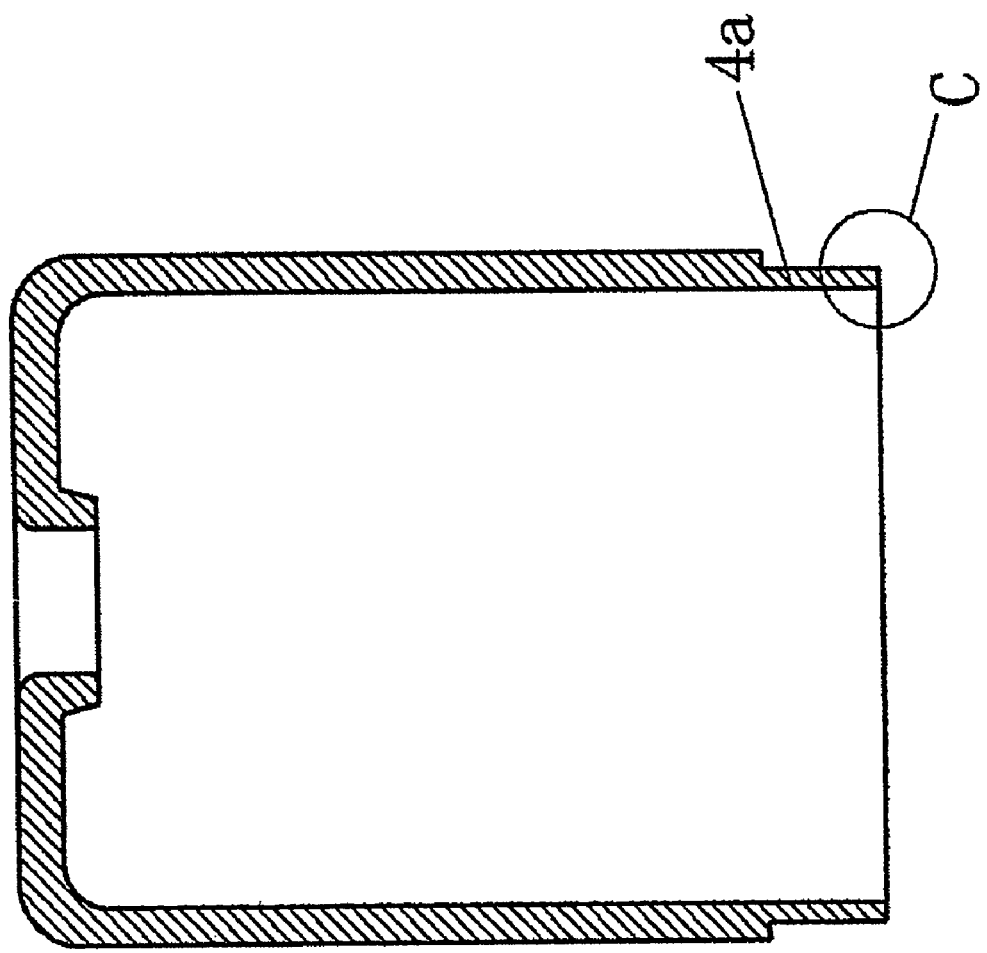
FIG. 11 is a cross section in the axial direction showing a yoke that is obtained by the manufacturing method according to FIG. 3(a) through FIG. 10.
Figure 12:
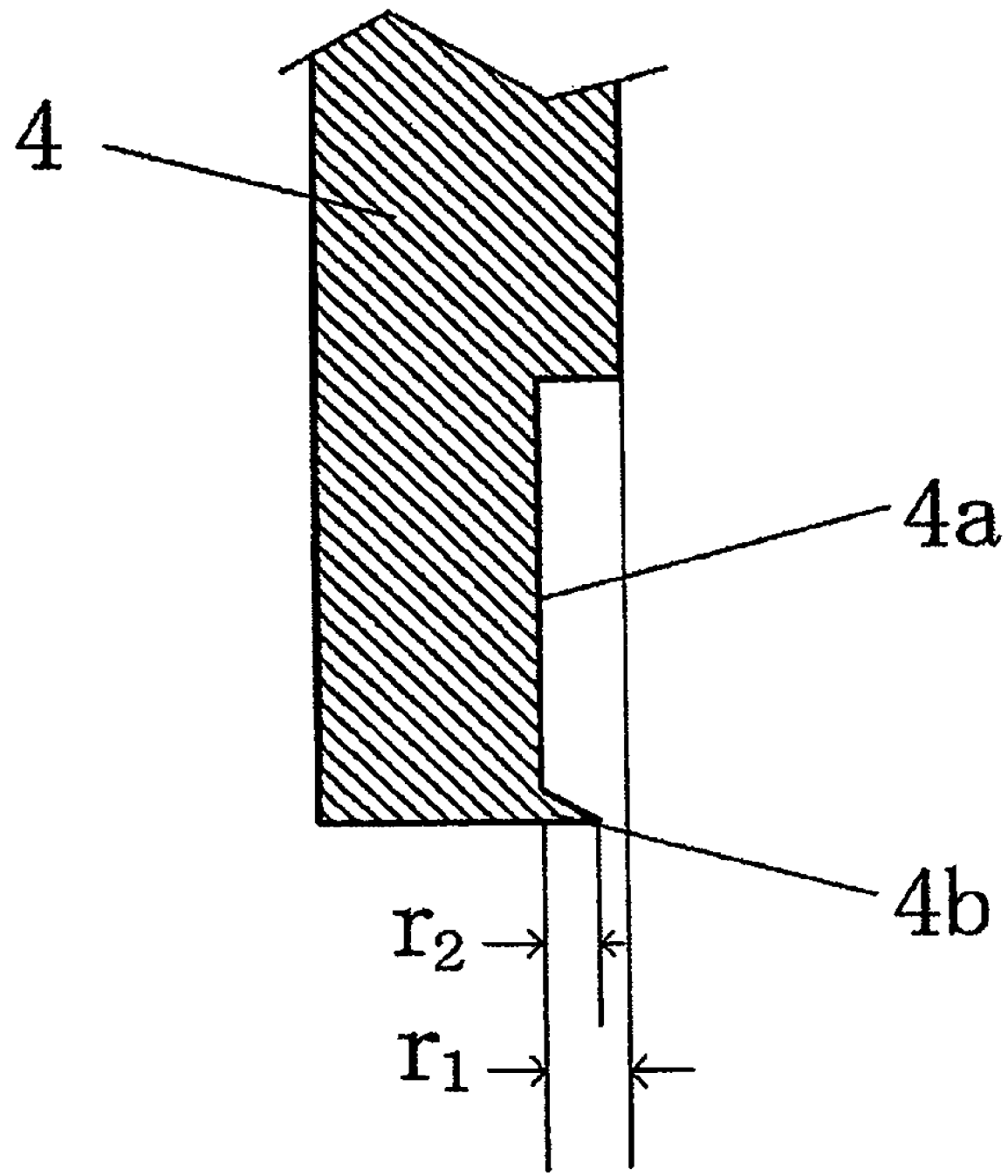
FIG. 12 is an enlarged diagram of C portion in FIG. 11.
Figure 13:
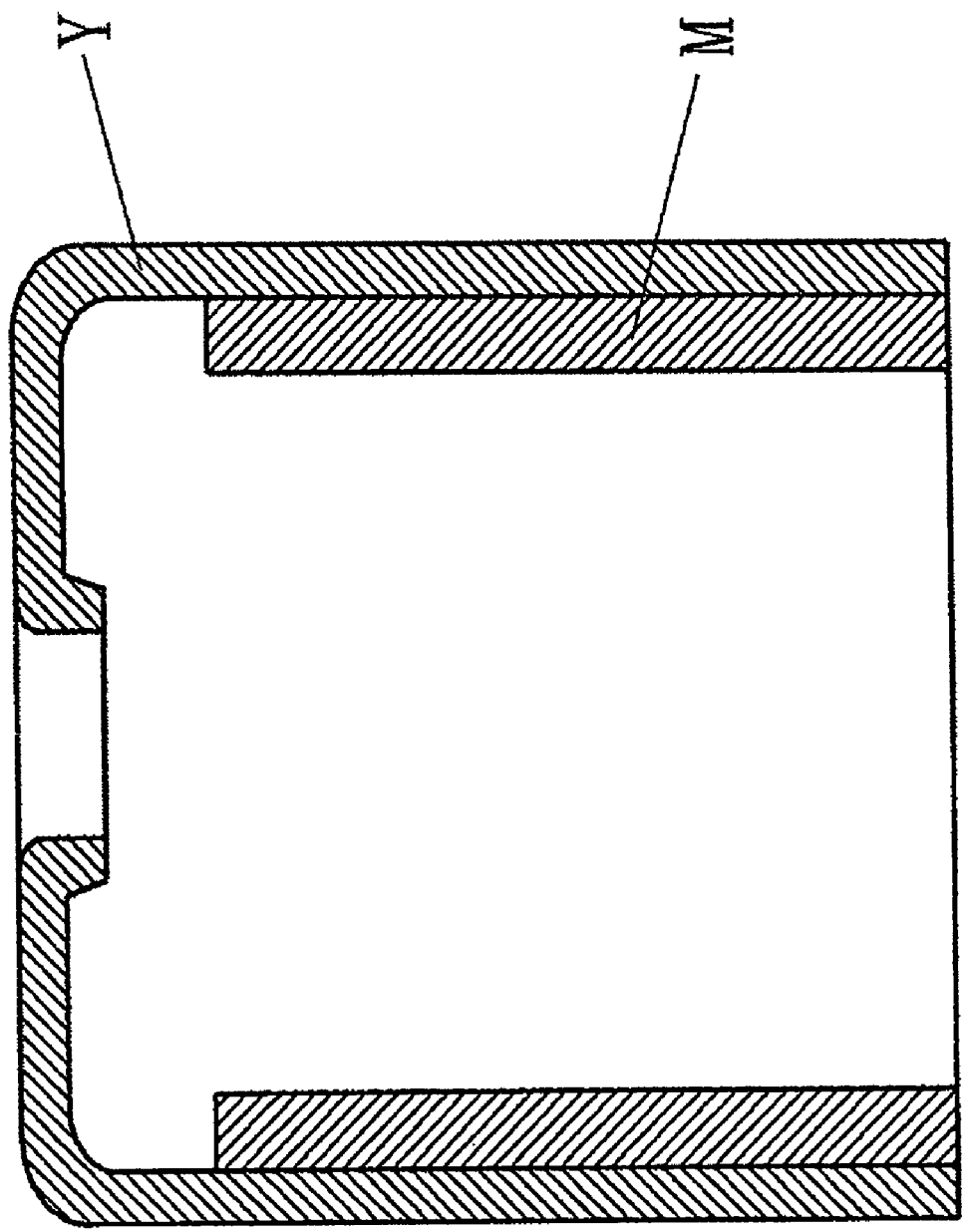
FIG. 13 is a cross section in the axial direction showing a relationship between a yoke of an outer rotor type motor and a magnet.
Figure 14:
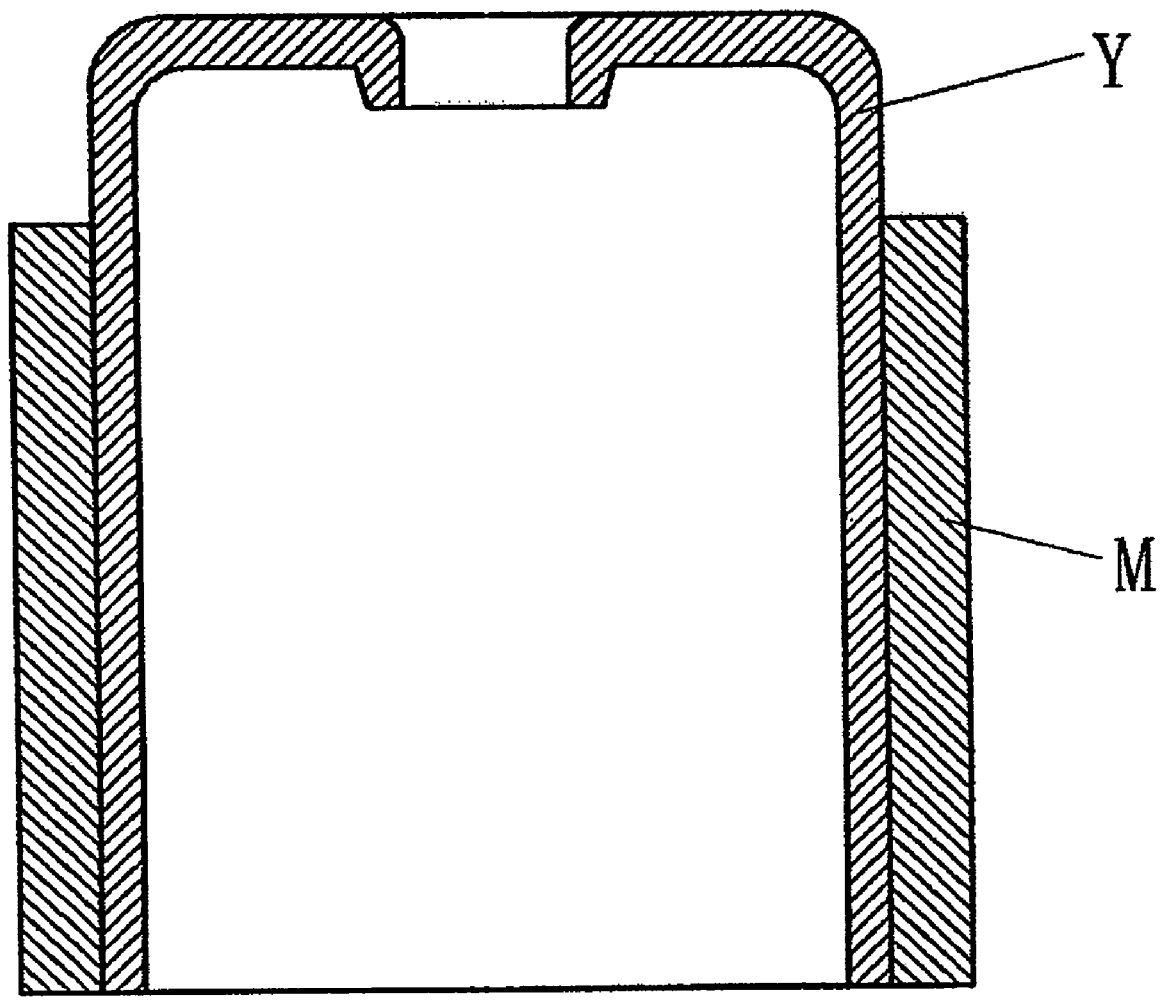
FIG. 14 is a cross section in the axial direction showing a relationship between a yoke of an inner rotor type motor and a magnet.
Figure 15:
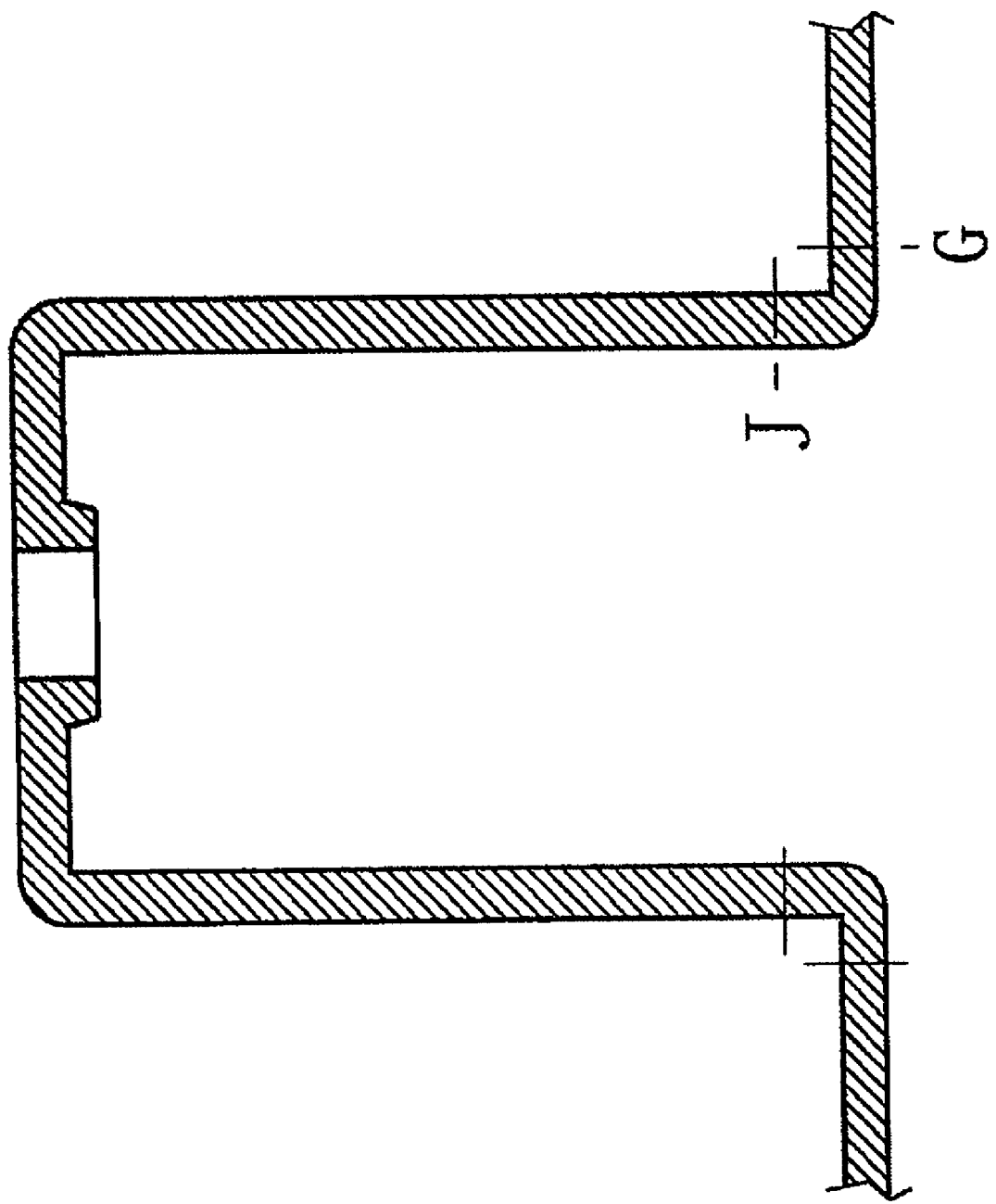
FIG. 15 is a cross section in the axial direction showing a cylindrical portion of a yoke of a conventional motor.
Figure 16:
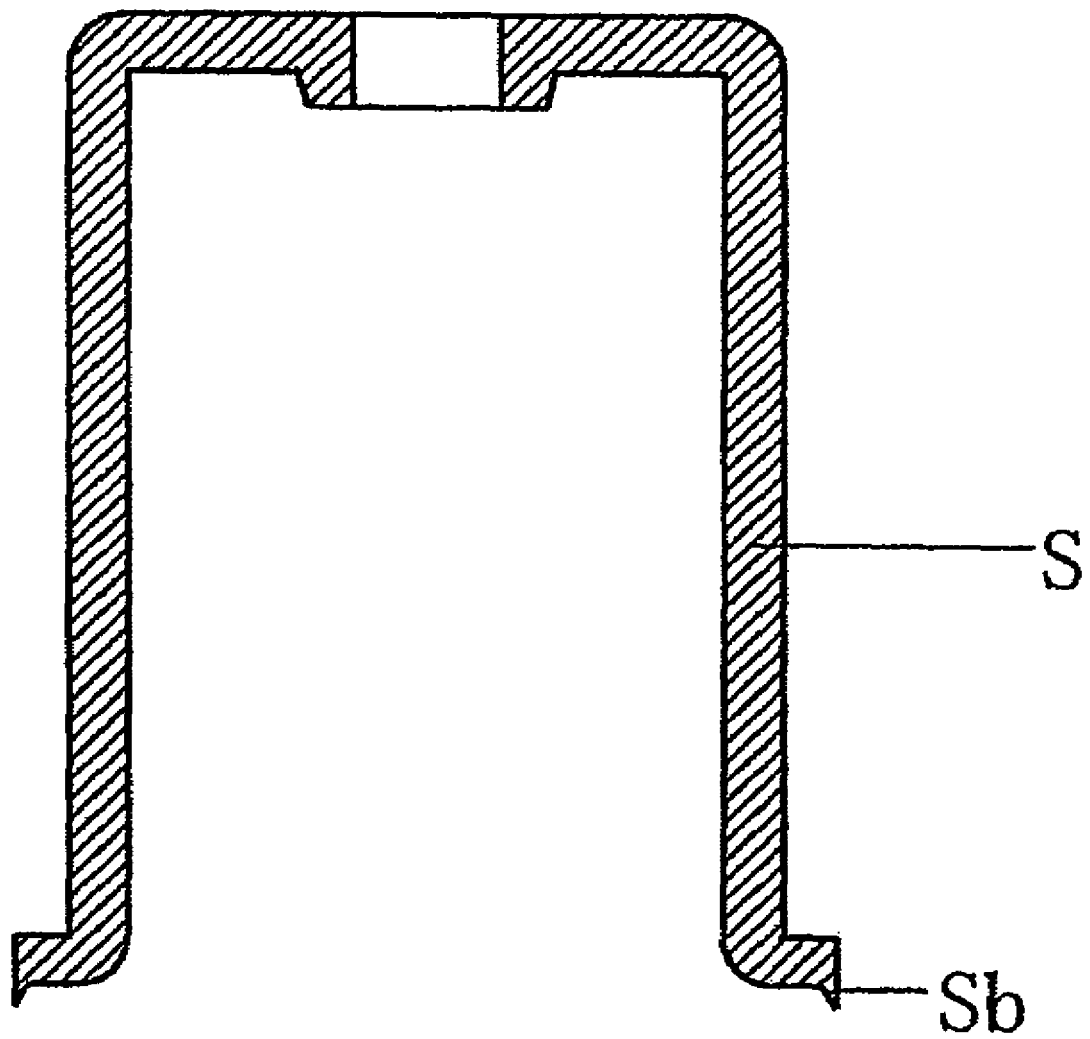
FIG. 16 is a cross section in the axial direction of a yoke that is obtained from the cylindrical portion in FIG. 15.
Figure 17:
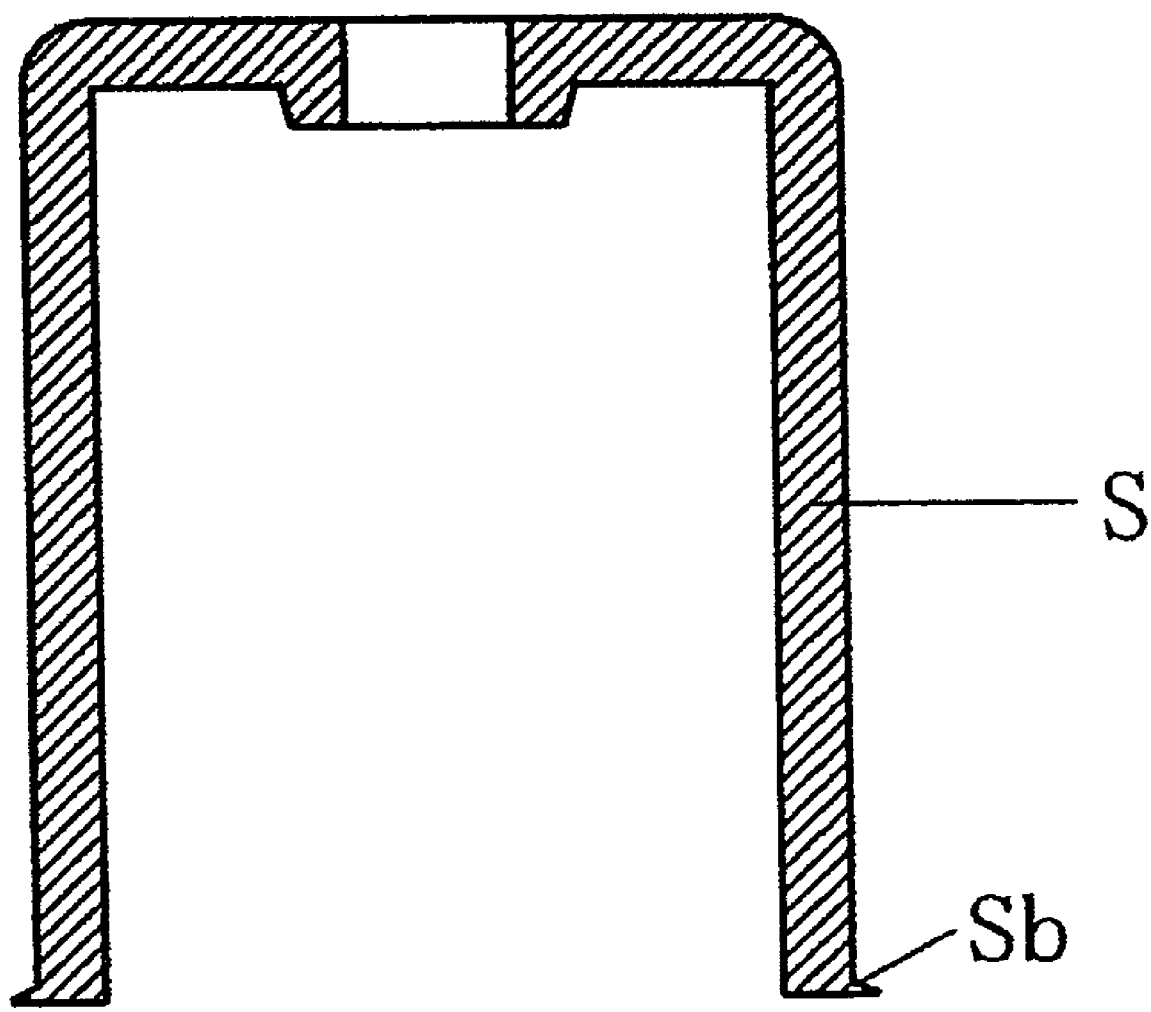
FIG. 17 is a cross section in the axial direction of another yoke that is obtained from the cylindrical portion in FIG. 15.

Therefore, a burr 4b that protrudes outward in the radial direction is formed at the lower end portion in the axial direction of the yoke 4 (at a side to which the annular member K contacts) as shown in FIG. 12 as an enlarged diagram of C portion in FIG. 11. However, a protruding length of the burr 4b outward in the radial direction is smaller than a difference between a diameter of the outer circumference surface except for the annular groove 4a of the yoke 4 and a diameter of the outer circumference surface in the annular groove 4a, so the tip portion of the burr 4b in the radial direction does not protruded from the outer circumference surface except for the annular groove 4a of the yoke 4 outward in the radial direction. Therefore, the magnet 10 can be made contact with the outer circumference surface of the yoke 4.

Note that the yoke 4 is formed by cutting in the radial direction as described above, there is no burr protruding in the axial direction formed at lower end portion in the axial direction. Therefore, a height of the yoke 4 becomes a dimension with little error so that the yoke 4 can be formed precisely. For this reason, the lower end portion in the axial direction of the yoke 4 does not contact the Hall device 62 or others that is arranged closely to the yoke 4.

As described above, according to the present invention, when the annular groove 4a is formed in the direction that the cylindrical portion L protrudes (or recess) by the deep drawing process from one of both sides of the sheet iron F that is a flat plate, the annular groove 4a is formed on the outer circumference surface (or the inner circumference surface) of the cylindrical member after the deep drawing process. Then, the annular groove 4a becomes a recess continuing the end portion of the cylindrical member after the cylindrical portion L is cut in the radial direction by the cutting tool. The annular groove 4a is formed in the state of the sheet iron before the deep drawing process, so it can be formed easily in a uniform depth by pressing the sheet iron by the annular punch or the like.

In addition, a cylindrical member can be provided that is superior in accuracy of height and an annular member such as a magnet can be fixed or secured easily on an inner or an outer circumference surface thereof. Therefore, when using the cylindrical member as a yoke of a motor, positions in the axial direction of the yoke and the magnet are not uneven, and the magnet can be fixed or secured to the yoke, so a motor having a good reliability can be provided inexpensively.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

For example, the present invention can be applied to any structure in which an annular member is fixed or secured to an inner circumference surface or an outer circumference surface of a cylindrical member (regardless of magnetic or non-magnetic) that is formed by a plastic deformation, so that the same effect as that of the present invention can be obtained.

In addition, though this embodiment is described about an inner rotor type motor, the present invention is not limited to this but can be also applied to an outer rotor type motor, so that the same effect as that of the present invention can be obtained. In the case of the outer rotor type motor, the annular groove is formed on the lower inner circumference surface in the axial direction of the yoke.

What is claimed is:

1. A method for manufacturing a cylindrical member having a cylindrical portion and an annular member fixed on and in contact with an outer circumference of the cylindrical portion, the annular member having an upper end portion and an lower end portion, comprising the steps of:
   forming an annular groove on the upper surface of a flat plate;
   forming the cylindrical portion by a plastic deformation of the flat plate by inserting a die from lower to upper direction, the annular groove being located on the outer circumference surface of the cylindrical portion;
   cutting the cylindrical portion out of the flat plate in from inner to outer direction, the cutting line being located in the annular groove; and
   fixing or securing the annular member on and in contact with the outer circumference surface of the cylindrical portion; wherein
   the annular member is fixed or secured so that the lower end portion of the annular member is located on the same plane as the end portion of the cylindrical portion or protrudes in from upper to lower direction from the end portion of the cylindrical portion, and
   the annular groove is located adjacent to the end portion of the cylindrical portion, so that a burr that is formed in the cutting step is housed in the annular groove.

2. The method for manufacturing a cylindrical member according to claim 1, wherein the annular groove is formed by pressing the flat plate in from upper to lower direction.

3. The method for manufacturing a cylindrical member according to claim 1, wherein the burr protrudes from the end portion in from inner to outer direction.

4. The method for manufacturing a cylindrical member according to claim 3, wherein the relationship r1>r2 is satisfied when r1 is a depth of the annular groove in the radial direction, and r2 is a length of the burr that protrudes outward in the radial direction.

5. A method for manufacturing a motor including a cylindrical member, the cylindrical member having a cylindrical portion and an annular member fixed on and in contact with an outer circumference of the cylindrical portion, the annular member having an upper end portion and an lower end portion, comprising the steps of:
   forming an annular groove on the upper surface of a flat plate;
   forming the cylindrical portion by a plastic deformation of the flat plate by inserting a die from lower to upper direction, the annular groove being located on the outer circumference surface of the cylindrical portion;
   cutting the cylindrical portion out of the flat plate in from inner to outer direction, the cutting line being located in the annular groove; and
   fixing or securing the annular member on and in contact with the outer circumference surface of the cylindrical portion; wherein
   the annular member is fixed or secured so that the lower end portion of the annular member is located on the same plane as the end portion of the cylindrical portion or protrudes in from upper to lower direction from the end portion of the cylindrical portion, and
   the annular groove is located adjacent to the end portion of the cylindrical portion, so that a burr that is formed in the cutting step is housed in the annular groove.

6. The method for manufacturing a cylindrical member according to claim 5, wherein the annular groove is formed on the upper surface of the flat plate by pressing the flat plate in from upper to lower direction.

7. The method for manufacturing a cylindrical member according to claim 5, wherein the burr protrudes from the end portion in from inner to outer direction.

8. The method for manufacturing a cylindrical member according to claim 7, wherein the relationship r1>r2 is satisfied when r1 is a depth of the annular groove in the radial direction, and r2 is a length of the burr that protrudes outward in the radial direction.

9. The method for manufacturing a motor according to claim 5, wherein the cylindrical member is yoke, and the annular member is a magnet.

10. A method for manufacturing a cylindrical member having a cylindrical portion and an annular member fixed on and in contact with an inner circumference of the cylindrical portion, the annular member having an upper end portion and an lower end portion, comprising the steps of:
    forming an annular groove on the lower surface of a flat plate;
    forming the cylindrical portion by a plastic deformation of the flat plate by inserting a die from lower to upper direction, the annular groove being located on the inner circumference surface of the cylindrical portion;
    cutting the cylindrical portion out of the flat plate in from outer to inner direction, the cutting line being located in the annular groove; and
    fixing or securing the annular member on and in contact with the inner circumference surface of the cylindrical portion; wherein
    the annular member is fixed or secured so that the lower end portion of the annular member is located on the same plane as the end portion of the cylindrical portion or protrudes in from upper to lower direction from the end portion of the cylindrical portion, and
    the annular groove is located adjacent to the end portion of the cylindrical portion, so that a burr that is formed in the cutting step is housed in the annular groove.

11. The method for manufacturing a cylindrical member according to claim 10, wherein the annular groove is formed on the lower surface of the flat plate by pressing the flat plate in from lower to upper direction.

12. The method for manufacturing a cylindrical member according to claim 10, wherein the burr protrudes from the end portion in from outer to inner direction.

13. The method for manufacturing a cylindrical member according to claim 12, wherein the relationship r1>r2 is satisfied when r1 is a depth of the annular groove in the radial direction, and r2 is a length of the burr that protrudes inward in the radial direction.

14. A method for manufacturing a motor including a cylindrical member, the cylindrical member having a cylindrical portion and an annular member fixed on and in contact with an inner circumference of the cylindrical portion, the annular member having an upper end portion and an lower end portion, comprising the steps of:
    forming an annular groove on the lower surface of a flat plate;
    forming the cylindrical portion by a plastic deformation of the flat plate by inserting a die from lower to upper direction, the annular groove being located on the inner circumference surface of the cylindrical portion;

cutting the cylindrical portion out of the flat plate in from outer to inner direction, the cutting line being located in the annular groove; and fixing or securing the annular member on and in contact with the inner circumference surface of the cylindrical portion; wherein the annular member is fixed or secured so that the lower end portion of the annular member is located on the same plane as the end portion of the cylindrical portion or protrudes in from upper to lower direction from the end portion of the cylindrical portion, and the annular groove is located adjacent to the end portion of the cylindrical portion, so that a burr that is formed in the cutting step is housed in the annular groove.

15. The method for manufacturing a cylindrical member according to claim 14, wherein the annular groove is formed on the lower surface of the flat plate by pressing the flat plate in from lower to upper direction.

16. The method for manufacturing a cylindrical member according to claim 14, wherein the burr protrudes from the end portion in from outer to inner direction.

17. The method for manufacturing a cylindrical member according to claim 16, wherein the relationship $r1>r2$ is satisfied when $r1$ is a depth of the annular groove in the radial direction, and $r2$ is a length of the burr that protrudes inward in the radial direction.

18. The method for manufacturing a motor according to claim 14, wherein the cylindrical member is yoke, and the annular member is a magnet.

* * * * *